United States Patent [19]

Watanabe

[11] Patent Number: 4,802,036

[45] Date of Patent: Jan. 31, 1989

[54] DUBBING TAPE RECORDER

[75] Inventor: Takashi Watanabe, Ichikawa, Japan

[73] Assignee: Tanashin Denki Co., Ltd., Tokyo, Japan

[21] Appl. No.: 51,691

[22] Filed: May 20, 1987

[30] Foreign Application Priority Data

Sep. 30, 1986 [JP] Japan ................................. 61-150519

[51] Int. Cl.$^4$ ............................................. G11B 15/68
[52] U.S. Cl. ......................................... 360/92; 360/137
[58] Field of Search .......................... 360/92, 137, 96.5

[56] References Cited

U.S. PATENT DOCUMENTS 4,551,775 11/1985 Koizumi ........................... 360/137 X Primary Examiner—A. J. Heinz
Attorney, Agent, or Firm—Wegner & Bretschneider

[57] ABSTRACT

A dubbing tape recorder is constructed of first and second tape drive mechanisms capable of performing playback and recording operations respectively; a playback control member for holding the first tape drive mechanism in a playback mode at its operating position, said playback control member having an engaging portion; a recording control member for maintaining the second tape drive mechanism in a recording mode at an operating position; a pause control member for setting the recording mode into a waiting state while the recording control member is held at its operating position; a pause lock mechanism for holding the pause control member at its operating position; and a pause release mechanism having an engaged portion. The pause release mechanism is actuated by an engagement between the engaging portion and engaged portion only when the playback control member moves toward its operating position. When the pause control member is held at its operating position, the pause control member is released from its held state and is allowed to return to its non-operating position.

2 Claims, 5 Drawing Sheets

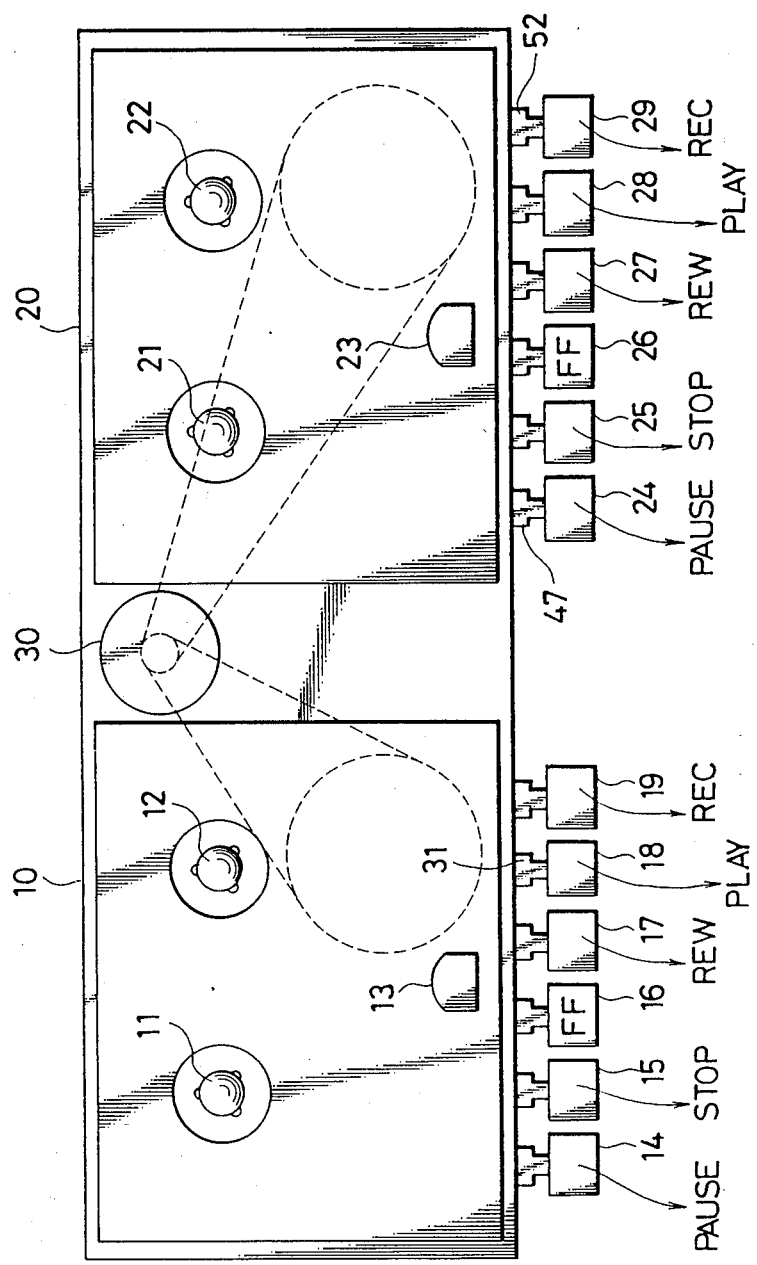

DUBBING TAPE RECORDER

BACKGROUND OF THE INVENTION (1) Field of the Invention:

This invention relates to a dubbing tape recorder, in particular, to a dubbing tape recorder permitting easy replacement of a magnetic tape on the playback side in the course of a dubbing operation.

(2) Description of the Prior Art:

As one example of tape recorders which enable dubbing, there is a cassette tape recorder disclosed in Japanese Patent Publication No. 2566/1979 of Hitachi, Ltd. This cassette tape recorder has such a structure that upon dubbing, a playback operation by one of the tape drive mechanisms and a recording operation by the other tape drive mechanism can be started at the same time and a playback operation (or recording operation) by one of the tape drive mechanisms can be started simultaneously with the completion of a playback operation (or recording operation) by the other tape drive mechanism. The latter operations are generally called "linking operation".

When one wants to replace, for editing purposes, the magnetic tape on the playback side by another magnetic tape in the dubbing mode in such a tape recorder, it is necessary to stop simultaneously the tape drive mechanisms on both sides and after replacement of the former magnetic tape by the latter magnetic tape, to set the recording side into a recording pause state and then to start the playback side so that the pause state of the recording side is released to resume the dubbing operation.

In order to replace the magnetic tape on the playback side upon a dubbing edition, the above-described conventional tape recorder requires the following 4-step operation, which is cumbersome.

(1) Stimultaneous stop of the tape drive mechanisms on both side.
(2) Replacement of the magnetic tape.
(3) Pause of recording.
(4) Resumption of playback.

SUMMARY OF THE INVENTION

An object of this invention is to provide a dubbing tape recorder which can solve the above-described conventional problem and is easy in operation upon replacement of a magnetic tape on the playback side in the course of a dubbing edition.

In one aspect of this invention, there is thus provided a dubbing tape recorder which comprises:

a first tape drive mechanism capable of performing at least a playback operation;

a playback control member for maintaining the first tape drive mechanism in a playback mode at an operating position, said playback control member having an engaging portion;

a second tape drive mechanism capable of performing at least a recording operation;

a recording control member for maintaining the second tape drive mechanism in a recording mode at an operating position;

a pause control member for setting the recording mode into a waiting state while the recording control member is held at its operating position;

a pause lock mechanism for holding the pause control member at an operating position; and a pause release mechanism having an engaged portion associated with the engaging portion, said pause release mechanism being actuated through each engagement between the engaging portion and engaged portion only when the playback control member moves toward the operating position thereof, whereby when the pause control member is held at the operating position thereof, the pause control member is released from its state held by the pause lock mechanism and is allowed to return to its non-operating position.

Namely, the recording pause state on the recording side is released when the playback control member on the playback side moves toward its operating position but is not released when the playback control member moves toward its non-operating position.

When one wants to replace the magnetic tape on the playback side by another magnetic tape for editing purposes while a dubbing operation is performed by the dubbing tape recorder of this invention with the first and second tape drive mechanisms set in the playback and recording modes respectively, the replacement of the magnetic tape can be conducted by merely setting the second tape drive mechanism in the recording pause state without need for setting same into the stop state.

BRIEF DESCRIPTION OF THE DRAWINGS

The above and other objects, features and advantages of the present invention will become apparent from the following description and the appended claims, taken in conjunction with the accompanying drawings, in which:

FIG. 1 is a simplified top plan view showing the outline structure of a dubbing tape recorder according to one embodiment of this invention;

DETAILED DESCRIPTION OF THE INVENTION AND PREFERRED EMBODIMENT

Figure 2A:
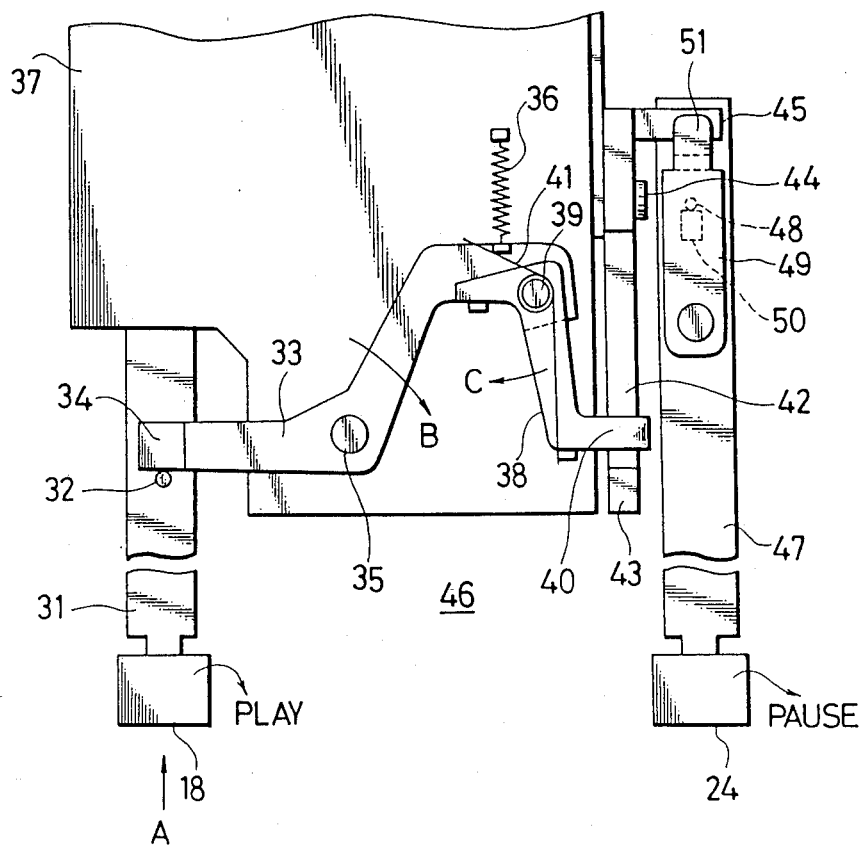
FIG. 2(a) is a simplified top plan view showing a playback control member of a first drive mechanism, a pause control member of a second drive mechanism and a linkage therebetween.
Figure 2B:
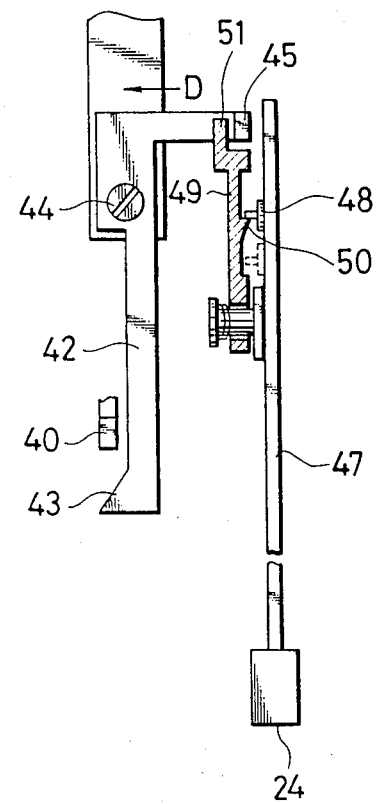
FIG. 2(b) is a simplified side view depicting the pause control member of the second drive mechanism and a third kick lever associated with the pause control member.
Figure 2C:
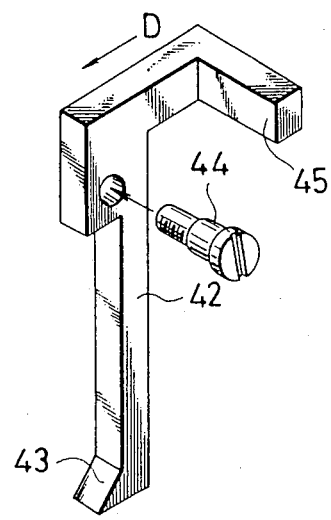
FIG. 2(c) is an enlarged perspective view of the third kick lever.

Referring first to FIG. 1, the dubbing tape recorder according to one embodiment of this invention is equipped with first and second tape drive mechanisms 10, 20. Incorporated in the first tape drive mechanism 10 are a pair of reel shafts 11, 12, a magnetic head 13 and unillustrated various mechanisms. At an operating part, there are also provided control buttons 14–19 for pause, stop, fast feeding (FF), rewinding (REW), playback and recording functions. Similarly, a pair of reel shafts 21, 22, a magnetic head 23 and unillustrated various mechanisms are also built in the second tape drive mechanism 20. At an operating part, there are also provided control buttons 24–29 for pause, stop, fast feeding (FF), rewinding (REW), playback and recording functions. Between these first and second tape drive mechanism 10, 20, there is arranged a tape drive motor which is used commonly for both tape drive mechanisms.

In the illustrated embodiment, the first and second tape drive mechanism 10, 20 can each perform both recording and playback. The first tape drive mechanism 10 may however be equipped only with the playback function while the second tape drive mechanism 20 may be equipped only with the recording function.

FIGS. 2(a) through 2(c) and FIG. 3 illustrate the construction of an essential part of the present invention. Namely, they show an interlocked mechanism between the playback/return operation in the first tape drive mechanism 10 and the recording pause/release operation in the second tape drive mechanism 20.

Namely, a pin-like engaging portion 32 is provided with a playback control member 31 which is connected to the playback button 18 in the first tape dirve mechanism 10. An engaged portion 34 provided at one end of a first kick lever 33 is in engagement with the engaging portion 32. The first kick lever 33 ids supported over the upper surface of a bracket 37 turnably about a pin 35 as a fulcrum and is biased counterclockwise by a coil spring 36.

On the other end of the first kick lever 33, a second kick lever 38 is provided turnably within a predetermined range about a pin 39 as a fulcrum. The second kick lever 38 is also biased counterclockwise by a torsion spring 41. In adjacent to the second kick lever 38, a third kick lever 42 is also provided on a side wall of the bracket 37 in such a way that the third kick lever 42 is turnable about a pin 44 as a fulcrum. As illustrated in FIG. 2 (c), the third kick lever 42 has at an end portion thereof a taper-like stepped portion 43 which is brought into sliding contact with a proximal end portion 40 of the second kick lever 38. On the other hand, the other end portion of the third kick lever 42 is bent in a direction parallel to the plane of the drawing sheet of FIG. 2(a) so that a pause release lever portion 45 is formed.

A pause release mechanism 46 is constructed by these first, second and third kick levers 33, 38, 42.

A lock pin 48 is attached to a pause control member 47 which is connected to the pause button 24 in the second tape drive mechanism 20. The pause state is locked upon engagement of the pin 48 with a taper-like stepped portion 50 of a pause lock member (pause lock mechanism) 49. A claw 51 is formed at an upper end portion of the pause lock member 49. The pause state is released when the pause release lever portion 45 of the third kick lever 42 engages the pawl 51 and lifts up the pawl 51.

The operation of the dubbing tape recorder according to the present embodiment will next be described. In FIG. 2(a), the recording control member 52 (see, FIG. 1) connected to the recording button 29 has been pushed to set the second tape drive mechanism 20, which is on the recording side, in the recording mode. The pause control member 47 has also been pushed to bring the lock pin 48 into engagement with the stepped portion 50 of the pause lock member 49. The pause state of the second tape drive mechanism 20 is locked.

Let's now assume that the playback button 18 is operated in this state to push the playback control member 31 in a direction indicated by an arrow A in the first tape drive mechanism 10 which is the playback side. The first kick lever 33, the engaged portion 34 of which is in engagement with the engaging portion 32 of the playback control member 31, turns in a direction indicated by an arrow B. As a result, the second kick lever 38 turns together with the first kick lever 33 and the end portion 40 of the second kick lever 38 undergoes sliding contact with the taper-like stepped portion 43 of the third kick lever 42, whereby the third kick lever 42 is turned in a direction indicated by an arrow D. As a consequence, the pause release lever portion 45 engages the claw 51 of the pause lock member 49 and lifts the pause lock member 49 upwardly. The stepped portion 50 of the pause lock member 49 is hence separated from the lock pin 48 so that the pause state is released.

When the first tape drive mechanism, the playback side, is set in the playback state, the recording pause state of the second tape drive mechanism 20 is released and the recording operation by the second tape drive mechanism 20 is started at the same time as the playback operation is started by the first tape drive mechanism 10 as described above.

Figure 3:
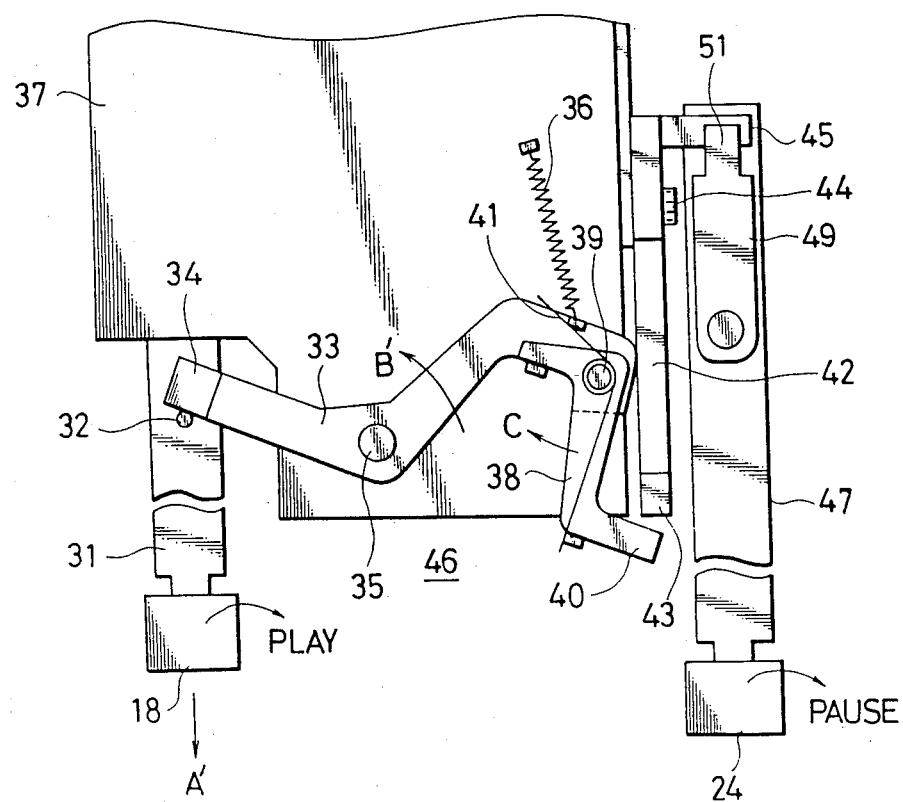
FIG. 3 is similar to FIG. 2(a), in which the first tape drive mechanism is in the playback mode while the second tape drive mechanism is in the recording pause mode.

FIG. 3 illustrates an operation state, in which the first tape drive mechanism 10 is in the playback state and the second tape drive mechanism 20 is, similar to the operation depicted in FIG. 2, in the recording pause state. The illustrated operation corresponds, for example, to a situation in which the second tape drive mechanism 20 has been set firstly in the recording pause state in order to replace the tape on the playback side in the course of recording while conducting a dubbing edition.

Figure 4:
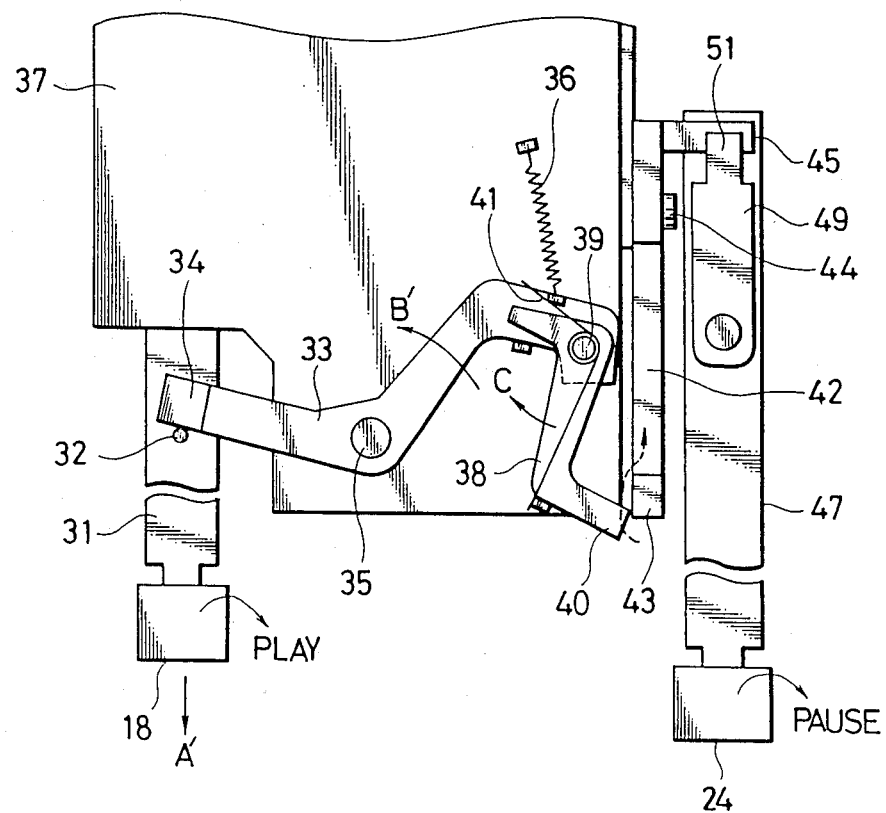
FIG. 4 is similar to FIG. 2(a), which illustrates that the recording pause state of the second drive mechanism is not released even when the first tape drive mechanism, which is in the recording state, is once stopped.

Let's now assume that in order to replace the tape on the playback side in the above situation, the playback button 18 is operated to cause the playback control member 31 to return in a direction indicated by arrow A' in the first tape drive mechanism 10, i.e., the playback side. The first kick lever 33 then turns in a direction indicated by an arrow B'. The second kick lever 38 also begins to turn counterclockwise about the pin 35. In the course of the counterclockwise turning of the second kick lever 38, the end portion 40 is brought into abutment against an end surface of the taper-like stepped portion 43 which end surface is opposite to the tapered surface of the stepped portion 43. As a consequence, the second kick lever 38 turns in the direction indicated by the arrow C so as to avoid its abutment against the third kick lever 42. Accordingly, the third kick lever 42 does not turn in the direction indicated by the arrow D unlike the situation in which the second kick lever 38 turns in the direction indicated by the arrow C in the state depicted in FIG. 2. The third kick lever 42 does not hence give the pause lock member 49 any releasing action. As the turning of the first kick lever 33 proceeds further, the end portion of the second kick lever 38 is allowed to move to the side of the tapered surface of the stepped portion 43 as shown by a dashed arrow in FIG. 4.

When the first tape drive mechanism 10, which is in the playback state, is once stopped in the above-described manner while the second tape drive mechanism 20 on the recording side is in the recording pause state, the recording pause state of the second tape drive mechanism 20 is not released. It is therefore possible to replace the tape on the playback side without stopping the second tape drive mechanism 20 temporarily.

So-called double-cassette tape decks like dubbing tape recorders of the present type are often used for dubbing editions. They are used ratehr occasionally in such a way that the playback (or recording) operation by one tape drive mechanism is started after completion of the playback (or recording) by the other tape drive mechanism, in other words, in so-called linking operations. Even if the function of linking operation is omitted, the practical value of such a tape recorder may be enhanced on the contrary by improving its operability upon a dubbing editon as in the present inveniton.

It should be noted that a linking operation is not necessarily rendered unfeasible when the present invention is employed. A linking operation is still feasible provided, for example, that an interlocked relation is established between a member operated only upon autostop (e.g., a member operable by a stop of a reel to kick a pushbutton lock plate in a releasing direction) in the tape drive mechanism on the playback side and the pause lock mechanism in the tape drive mechanism on the recording side, because the playback pause state (or recording pause state) of one of the tape drive mechanisms is released to perform linking playback (or linking recording) when the other tape drive mechanism is automatically stopped at a tape end.

Having now fully described the invention, it will be apparent to one of ordinary skill in the art that many changes and modifications can be made thereto without departing from the spirit or scope of the invention as set forth herein.

I claim:

1. A dubbing tape recorder comprising:
   a first tape drive mechanism capable of performing at least a playback operation;
   a playback control member for maintaining the first tape drive mechanism in a playback mode at an operating position, said playback control member having an engaging portion;
   a second tape drive mechanism capable of performing at least a recording operation;
   a recording control member or maintaining the second tape drive mechanism in a recording mode at an operating position;
   a pause control member for setting the recording mode into a waiting state while the recording control member is held at its operating position;
   a pause lock mechanism for holding the pause control member at an operating position; and
   a pause release mechanism having:
      a first kick lever, operatively coupled to said playback control member and responsive to reciprocation thereof, said first kick lever having a stopper portion,
      a second kick lever pivotally connected to said first kick lever and prevented from turning in a prescribed direction by said stopper portion of said first kick lever, and
      a torsion spring normally biasing said second kick lever against said stopper portion of said first kick lever.

2. A dubbing tape recorder as in claim 1, wherein when said playback control member moves forward, said second kick lever applies a releasing force to said pause lock mechanism, while said stopper portion maintains said second kick lever in a non-turning state, and when said playback control member returns to its original position, the force from said pause lock mechanism causes the second kick lever to turn, deforming said torsion spring, so that no release force is applied to the pause lock mechanism.

* * * * *